US011874076B2

(12) United States Patent
Eguchi et al.

(10) Patent No.: US 11,874,076 B2
(45) Date of Patent: Jan. 16, 2024

(54) HEAT EXCHANGER CORE AND HEAT EXCHANGER

(71) Applicant: MITSUBISHI HEAVY INDUSTRIES, LTD., Tokyo (JP)

(72) Inventors: Shunsaku Eguchi, Tokyo (JP); Minemasa Omura, Tokyo (JP); Yoichi Uefuji, Tokyo (JP); Hiroyuki Nakaharai, Tokyo (JP); Koichi Tanimoto, Tokyo (JP); Masaya Hatanaka, Tokyo (JP); Nobuhide Hara, Tokyo (JP); Takuo Oda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/801,214

(22) PCT Filed: Feb. 24, 2021

(86) PCT No.: PCT/JP2021/006810
§ 371 (c)(1),
(2) Date: Aug. 19, 2022

(87) PCT Pub. No.: WO2021/172340
PCT Pub. Date: Sep. 2, 2021

(65) Prior Publication Data
US 2022/0412674 A1 Dec. 29, 2022

(30) Foreign Application Priority Data

Feb. 27, 2020 (JP) .................................. 2020-031552

(51) Int. Cl.
*F28F 9/02* (2006.01)
(52) U.S. Cl.
CPC ................................ *F28F 9/0268* (2013.01)

(58) Field of Classification Search
CPC ........ F28F 9/0268; F28F 9/026; F28F 9/0265; F28F 9/02
(Continued)

(56) References Cited

U.S. PATENT DOCUMENTS 2,344,588 A * 3/1944 Blauvelt .................... F28F 9/24
165/146
2,400,617 A * 5/1946 Wheller .................. F24F 13/04
165/166

(Continued)

FOREIGN PATENT DOCUMENTS

CN 102494547 A 6/2012
EP 3 627 087 A1 3/2020

(Continued)

OTHER PUBLICATIONS

International Preliminary Report on Patentability and Written Opinion of the International Searching Authority for International Application No. PCT/JP2021/006810, dated Sep. 9, 2022, with an English translation.

(Continued)

*Primary Examiner* — Claire E Rojohn, III
(74) *Attorney, Agent, or Firm* — Birch, Stewart, Kolasch & Birch, LLP

(57) ABSTRACT

A heat exchanger core according to an embodiment includes: a first header space; a plurality of first layered header passages; a plurality of first communication port rows; and a plurality of first passages. The plurality of first layered header passages are stacked in a perpendicular direction to a reference plane so as to each extend along the reference plane. Each first layered header passage has an open end at a first edge adjacent to the first header space and communicates with the first header space through the open end. The plurality of first communication port rows are arranged in the perpendicular direction so as to correspond (Continued)

to the plurality of first layered header passages, respectively. Each first communication port row is formed by a plurality of first communication ports arranged along the reference plane. The plurality of first passages communicate with any of the first layered header passages through the plurality of first communication ports.

13 Claims, 10 Drawing Sheets

(58) Field of Classification Search
USPC .......................................................... 165/148
See application file for complete search history.

(56) References Cited

U.S. PATENT DOCUMENTS

| | | | | |
|---|---|---|---|---|
| 2,812,165 | A * | 11/1957 | Hammond | F28D 9/00 |
| | | | | 165/DIG. 387 |
| 3,334,399 | A * | 8/1967 | Teeguarden | F28D 9/0056 |
| | | | | 29/890.039 |
| 3,703,925 | A * | 11/1972 | Ireland | F28F 1/28 |
| | | | | 165/DIG. 461 |
| 4,116,271 | A * | 9/1978 | De Lepeleire | F28F 9/02 |
| | | | | 165/DIG. 356 |
| 4,913,776 | A * | 4/1990 | Finnemore | F28D 9/0025 |
| | | | | 165/166 |
| 5,725,051 | A * | 3/1998 | Veltkamp | F28F 9/02 |
| | | | | 165/165 |
| 9,068,780 | B2 * | 6/2015 | Slaughter | F28F 9/22 |
| 9,733,026 | B2 * | 8/2017 | Stieger | F28D 9/0037 |
| 2010/0270011 | A1 | 10/2010 | Takahashi et al. | |
| 2020/0300561 | A1 | 9/2020 | Walter et al. | |
| 2023/0251041 | A1 * | 8/2023 | Hara | F28F 21/086 |
| | | | | 165/174 |
| 2023/0299394 | A1 * | 9/2023 | Tanimoto | H01M 50/15 |
| | | | | 429/176 |

FOREIGN PATENT DOCUMENTS

| | | |
|---|---|---|
| JP | 2010-271031 A | 12/2010 |
| JP | 5797328 B2 | 10/2015 |
| JP | 2017-106648 A | 6/2017 |
| JP | 2018-189352 A | 11/2018 |
| JP | 2019-510191 A | 4/2019 |
| WO | WO 2018/216166 A1 | 11/2018 |

OTHER PUBLICATIONS

International Search Report for International Application No. PCT/JP2021/006810, dated Apr. 27, 2021.

* cited by examiner

A-A

B1-B1

C-C

D-D

D-D

HEAT EXCHANGER CORE AND HEAT EXCHANGER

TECHNICAL FIELD

The present disclosure relates to a heat exchanger core and a heat exchanger.

BACKGROUND

For example, a heat exchange element (heat exchanger core) for heat exchange between two fluids has a group of a plurality of passages extending along the flow direction of the fluids. The two fluids exchange heat via a partition wall or the like that separates the two fluids when flowing through the plurality of passages (see Patent Document 1, for example).

CITATION LIST

Patent Literature

Patent Document 1: JP5797328B

SUMMARY

Problems to be Solved

For example, when a header space facing open ends of the plurality of passages in the heat exchange element described in the above patent document is formed so that a fluid is introduced from the header space into the plurality of passages, if there is a variation in the opening area between the passages, the flow rate of the fluid may vary between the passages, which may reduce the heat exchange efficiency.

In view of the above, an object of at least one embodiment of the present disclosure is to provide a heat exchanger with excellent heat exchange efficiency.

Solution to the Problems (1) A heat exchanger core according to at least one embodiment of the present disclosure is provided with: a first header space; a plurality of first layered header passages stacked in a perpendicular direction to a reference plane such that each first layered header passage extends along the reference plane, wherein each first layered header passage has an open end at a first edge adjacent to the first header space and communicates with the first header space through the open end; a plurality of first communication port rows arranged in the perpendicular direction so as to correspond to the plurality of first layered header passages, respectively, wherein each first communication port row is formed by a plurality of first communication ports arranged along the reference plane; and a plurality of first passages communicating with any of the first layered header passages through the plurality of first communication ports.

(2) A heat exchanger according to at least one embodiment of the present disclosure is provided with: the heat exchanger core having the configuration (1).

Advantageous Effects

According to at least one embodiment of the present disclosure, it is possible to achieve a heat exchanger core with excellent heat exchange efficiency.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
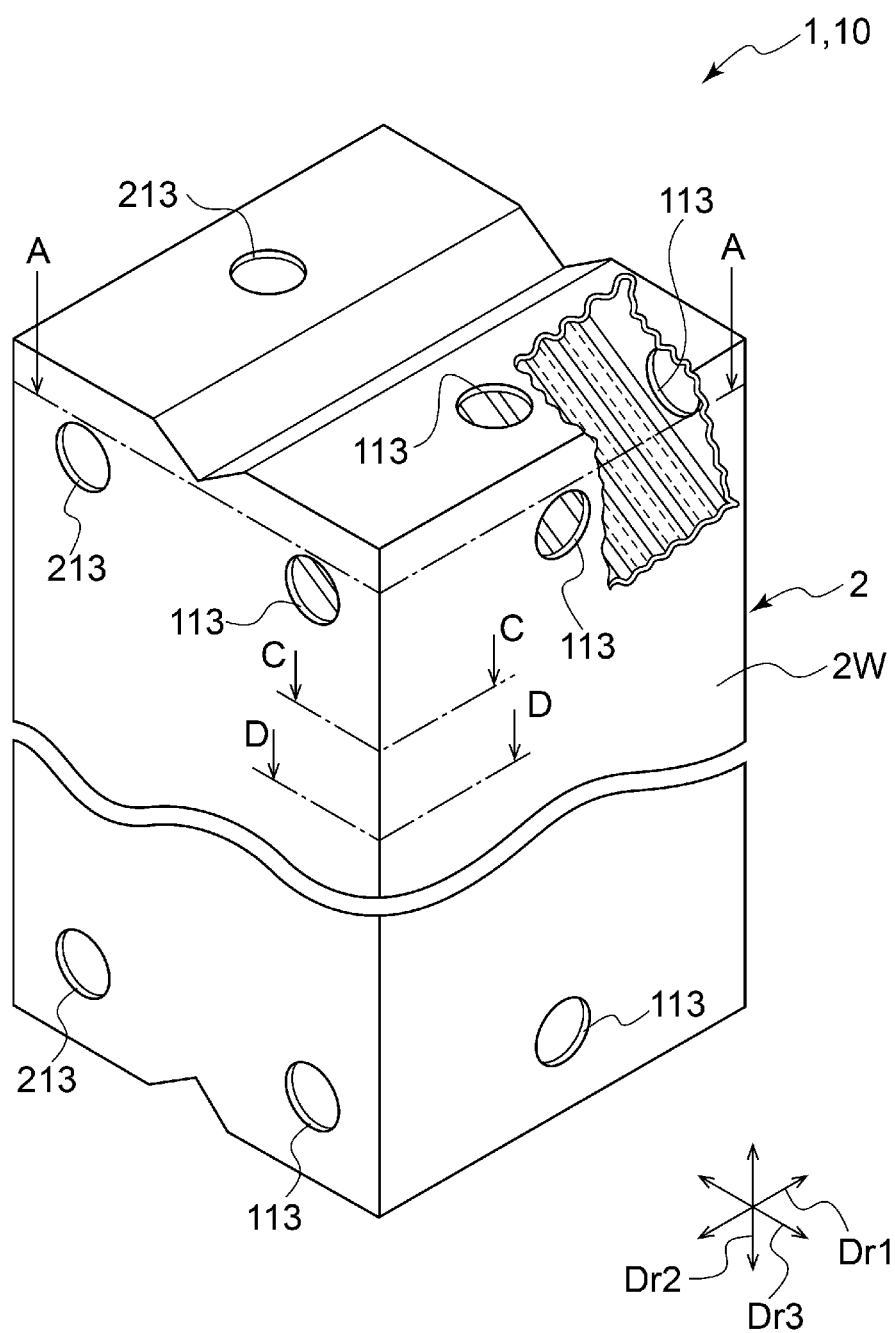
FIG. 1 is a schematic perspective view of a heat exchanger core of a heat exchanger according to some embodiments.

FIG. 1 is a schematic perspective view of a heat exchanger core 1 of a heat exchanger according to some embodiments.

Figure 2A:
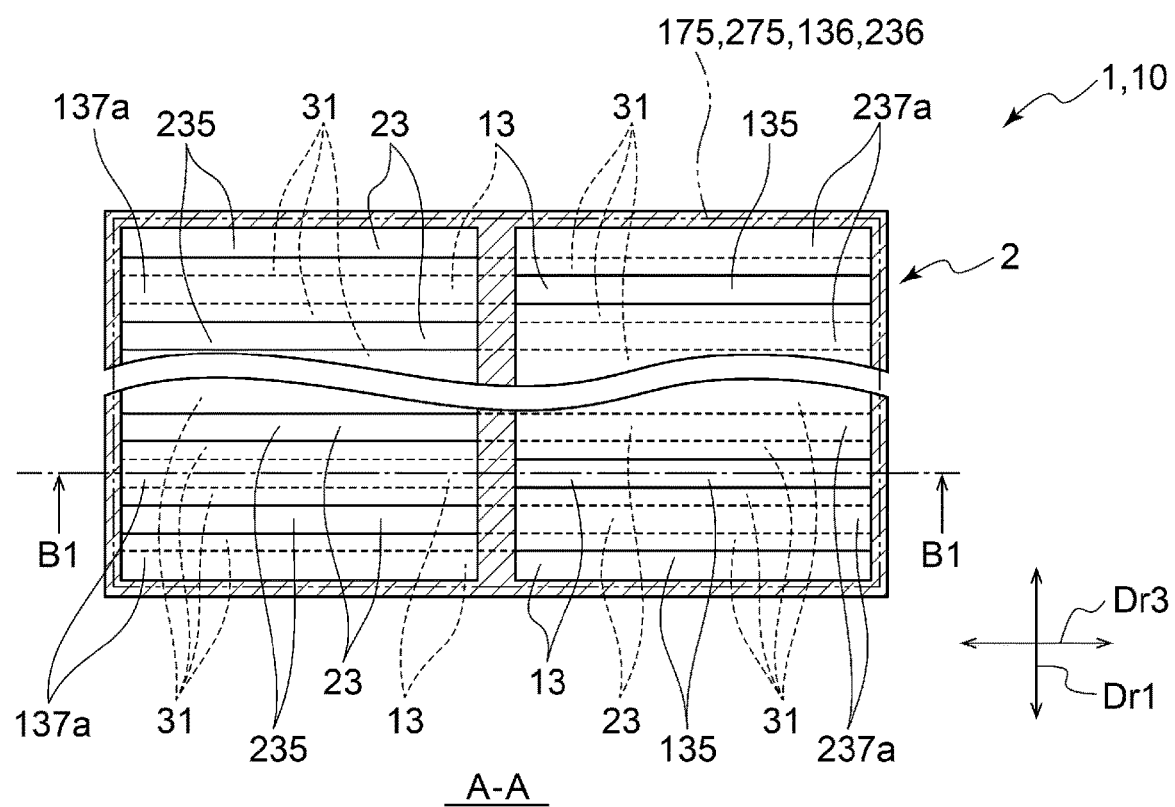
FIG. 2A is a cross-sectional view A in FIG. 1.

FIG. 2A is a cross-sectional view A in FIG. 1.

Figure 2B:
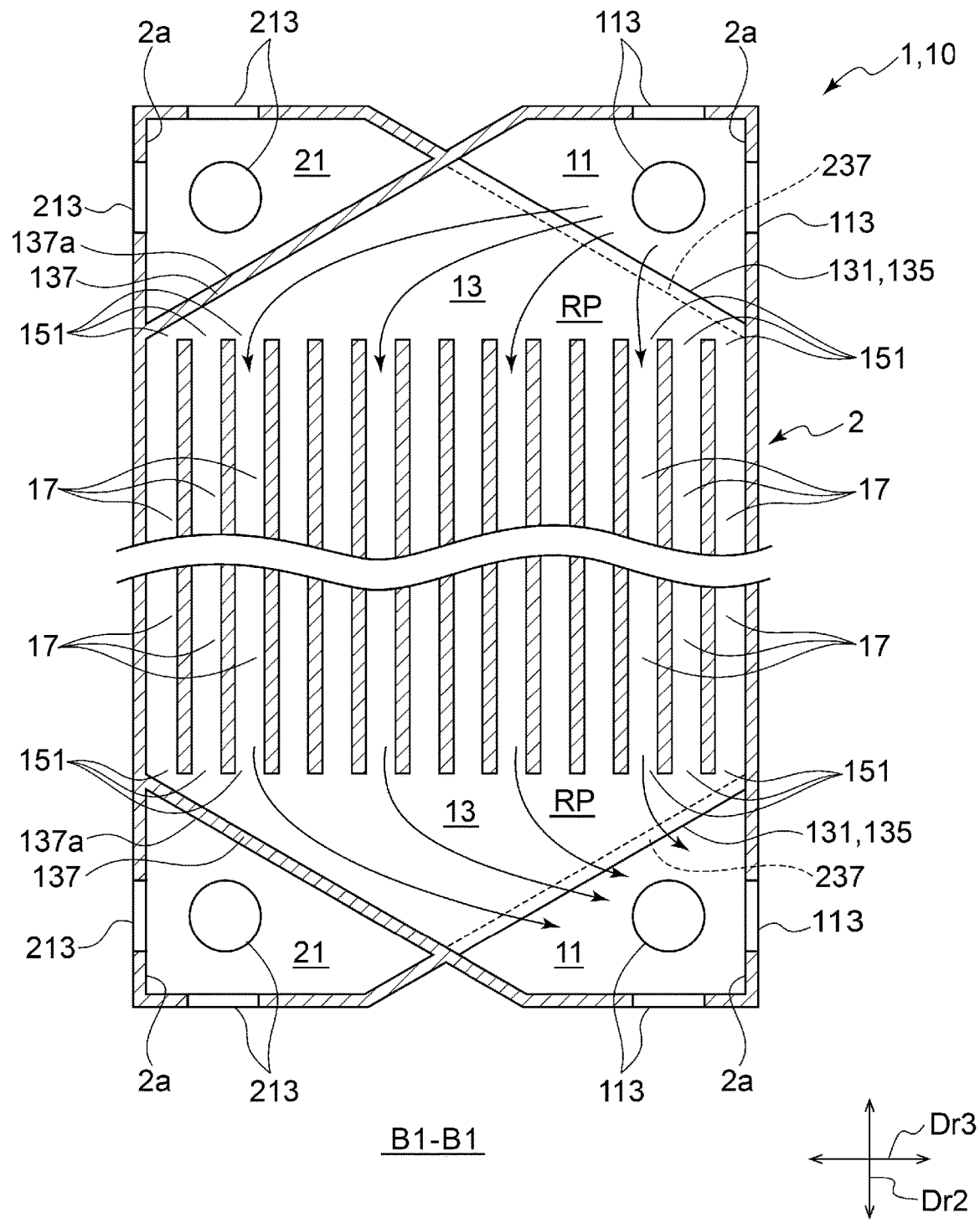
FIG. 2B is a cross-sectional view B1 in FIG. 2A.

FIG. 2B is a cross-sectional view B1 in FIG. 2A.

Figure 3A:
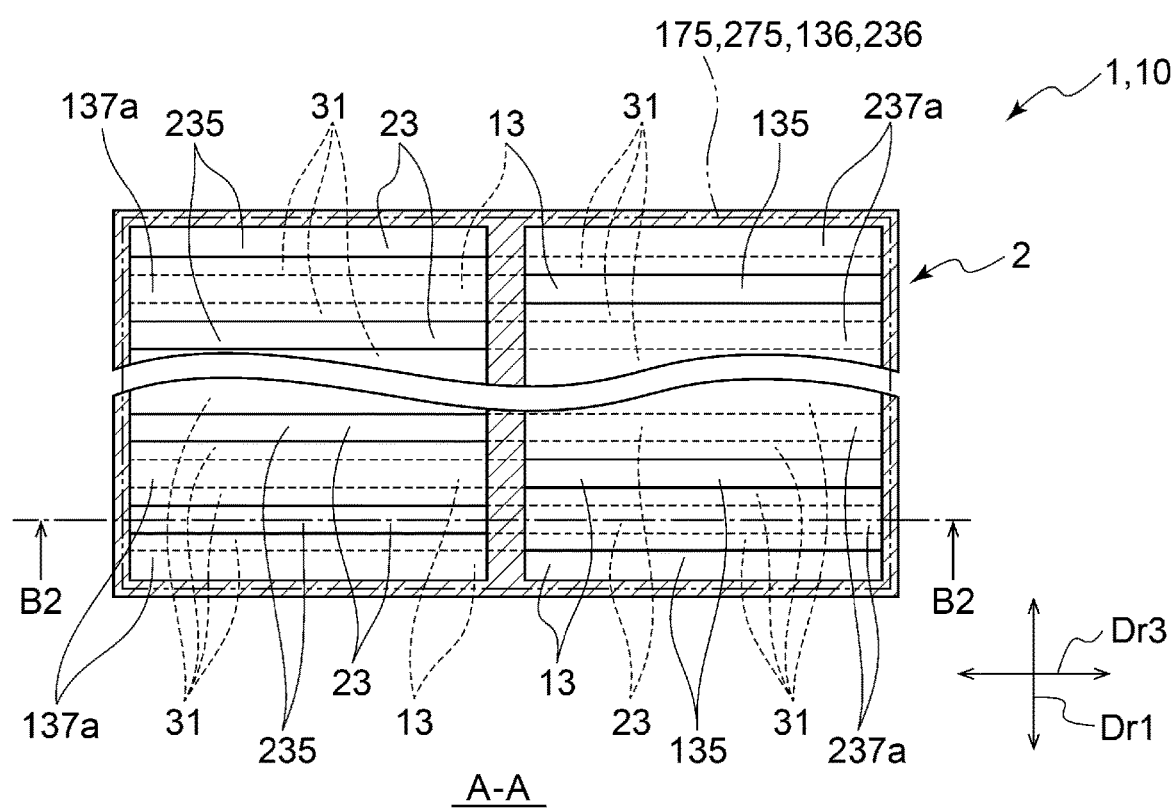
FIG. 3A is a cross-sectional view A in FIG. 1.

FIG. 3A is a cross-sectional view A in FIG. 1.

Figure 3B:
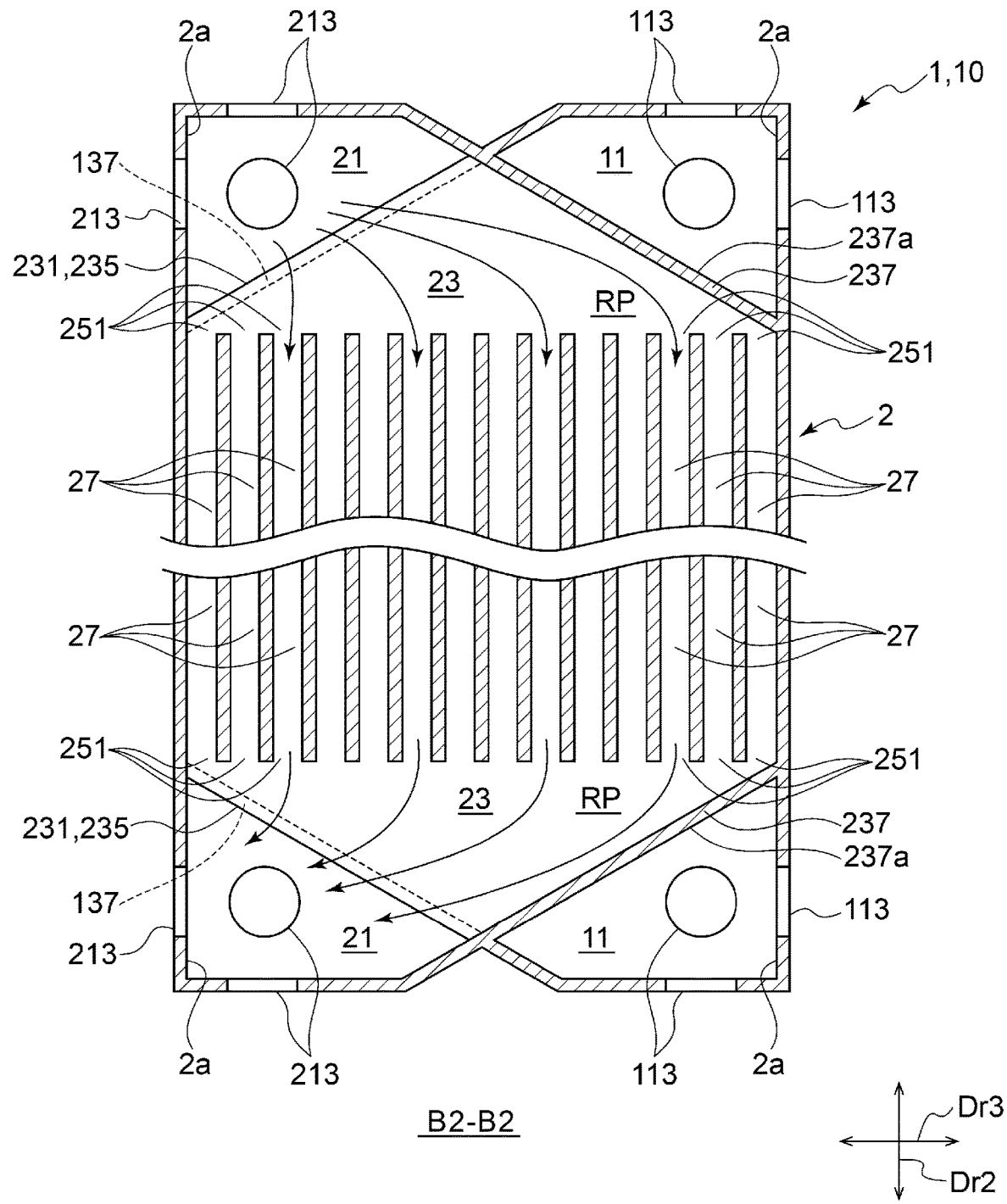
FIG. 3B is a cross-sectional view B2 in FIG. 3A.

FIG. 3B is a cross-sectional view B2 in FIG. 3A.

Figure 4:
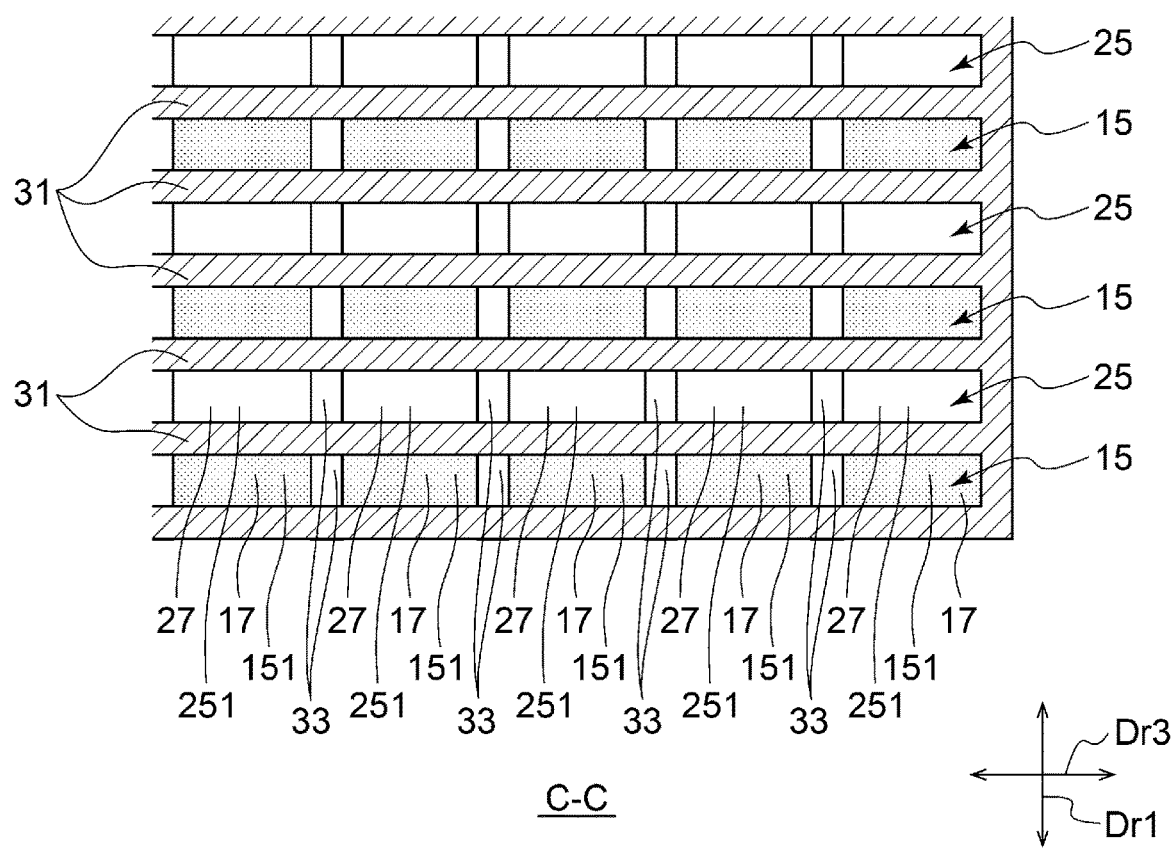
FIG. 4 is a cross-sectional view C in FIG. 1.

FIG. 4 is a cross-sectional view C in FIG. 1.

Figure 5A:
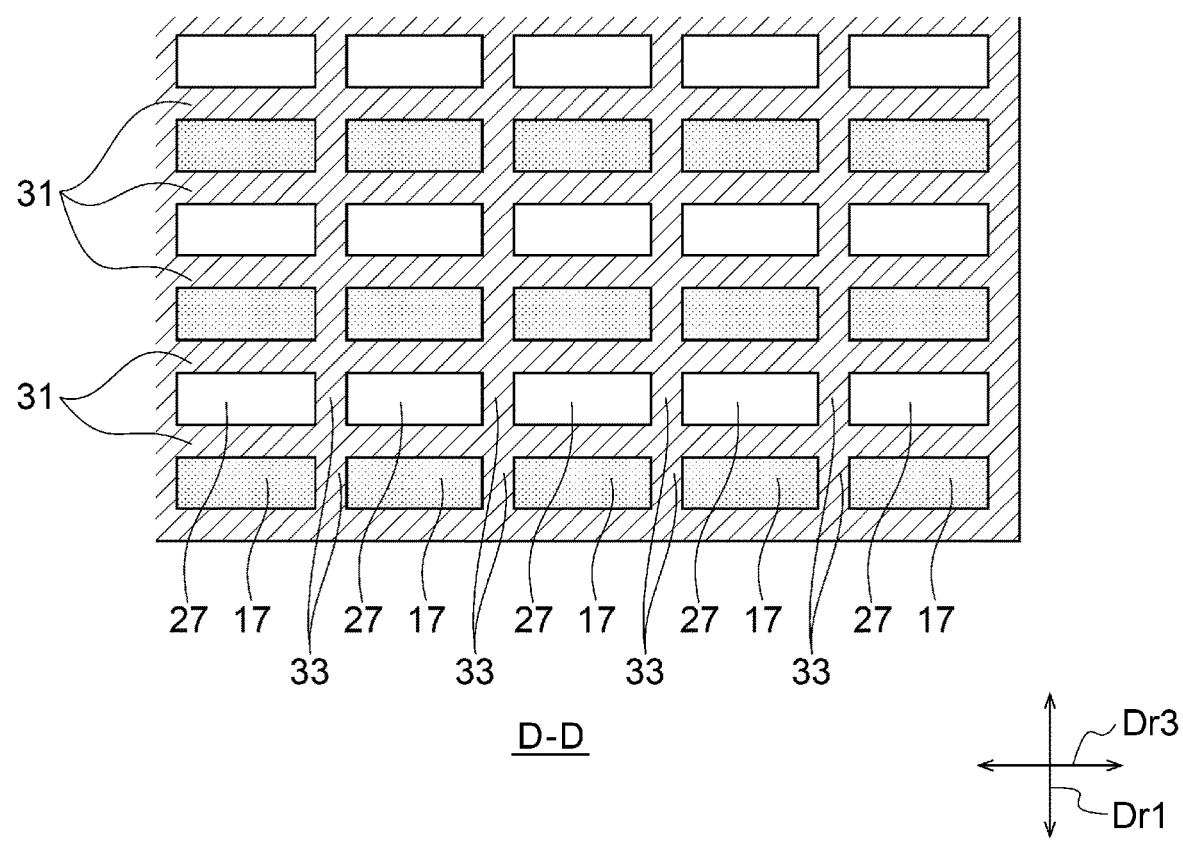
FIG. 5A is a cross-sectional view D in FIG. 1 of a heat exchanger core according to an embodiment.

FIG. 5A is a cross-sectional view D in FIG. 1 of a heat exchanger core according to an embodiment.

Figure 5B:
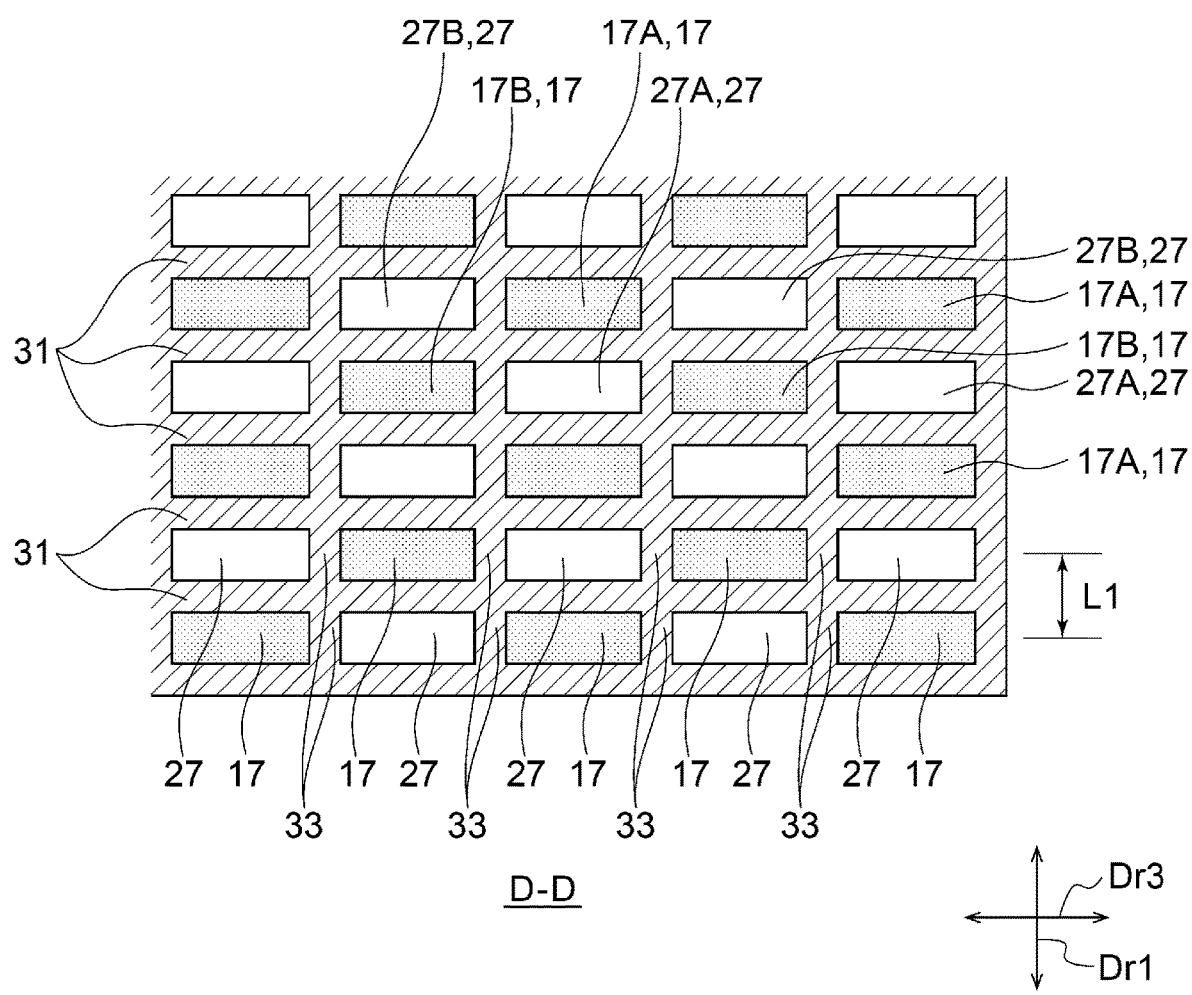
FIG. 5B is a cross-sectional view D in FIG. 1 of a heat exchanger core according to another embodiment.

FIG. 5B is a cross-sectional view D in FIG. 1 of a heat exchanger core according to another embodiment.

The heat exchanger core 1 shown in FIG. 1 is a heat exchanger core 1 used in a heat exchanger 10 for heat exchange between a first fluid and a second fluid. The heat exchanger core 1 according to some embodiments includes a first header space 11, a plurality of first layered header passages 13, a plurality of first communication port rows 15, and a plurality of first passages 17 inside a core housing 2.

The heat exchanger core 1 according to some embodiments includes a second header space 21, a plurality of second layered header passages 23, a plurality of second communication port rows 25, and a plurality of second passages 27 inside the core housing 2.

The first fluid and the second fluid may each be a liquid or a gas, but the temperatures of both are usually different. Although not limited, the core housing 2 of the heat exchanger core 1 may have a rectangular cuboid shape.

The heat exchanger core 1 shown in FIG. 1 may be used, for example, while being attached to a housing (not shown) of the heat exchanger 10. Alternatively, the heat exchanger core 1 shown in FIG. 1 may be used while being installed on a mount or supported by a tube (not shown) connected to the heat exchanger core 1, without being attached to the housing. In this case, the heat exchanger core 1 shown in FIG. 1 itself serves as the heat exchanger 10.

For convenience of explanation, directions of the heat exchanger core 1 according to some embodiments may be referred to as follows.

As will be described later in detail, in the heat exchanger core 1 according to some embodiments, the plurality of first layered header passages 13 and the plurality of second layered header passages 23 are layered passages each extending along a reference plane RP, and the plurality of first layered header passages 13 and the plurality of second layered header passages 23 are alternately stacked in a direction perpendicular to the reference plane RP. For convenience of explanation, the direction perpendicular to the reference plane RP is also referred to as a first direction Dr1.

Further, the extension direction of the plurality of first passages 17 and the plurality of second passages 27, which is the direction included in the extension direction of the reference plane RP, is also referred to as a second direction Dr2.

The direction included in the extension direction of the reference plane RP and perpendicular to the first direction Dr1 and the second direction Dr2 is also referred to as a third direction Dr3. The extension direction of each first communication port row 15 and each second communication port row 25 coincides with the third direction Dr3.

The first direction Dr1, the second direction Dr2, and the third direction Dr3 are perpendicular to each other.

In the heat exchanger core 1 according to some embodiments, for example, as shown in FIG. 1, when the core housing 2 has a rectangular cuboid shape, one of three mutually perpendicular axes of the core housing 2 may coincide with the first direction Dr1, the other one may coincide with the second direction Dr2, and the remaining one may coincide with the third direction Dr3.

(First Header Space 11 and Second Header Space 21)

In the heat exchanger core 1 according to some embodiments, the first header spaces 11 are formed on one end side and the other end side of the core housing 2 along the second direction Dr2. Similarly, in the heat exchanger core 1 according to some embodiments, the second header spaces 21 are formed on one end side and the other end side of the core housing 2 along the second direction Dr2.

In the heat exchanger core 1 according to some embodiments, the first header spaces 11 formed on both end sides of the core housing 2 along the second direction Dr2 have the same configuration. In the following description, of the two first header spaces 11, the first header space 11 on the upper side in FIGS. 1 and 2B will be mainly described, and the description of the first header space 11 on the lower side in the figures will be omitted.

Further, in the heat exchanger core 1 according to some embodiments, the second header spaces 21 formed on both end sides of the core housing 2 along the second direction Dr2 have the same configuration. In the following description, of the two second header spaces 21, the second header space 21 on the upper side in FIGS. 1 and 2B will be mainly described, and the description of the second header space 21 on the lower side in the figures will be omitted.

In the heat exchanger core 1 according to some embodiments, the first header space 11 has a polyhedral shape defined by an inner wall surface 2a of the core housing 2 and an outer wall surface 237a of a second inclined wall portion 237, which is a portion of the wall portion defining the second layered header passage 23, which will be described later.

In the heat exchanger core 1 according to some embodiments, a first opening 113 connecting the first header space 11 and the outside of the core housing 2 is formed on each wall portion 2W of the core housing 2 oriented in the first direction Dr1, the second direction Dr2, and the third direction Dr3. The first opening 113 is a communication port for allowing a fluid to flow between the first header space 11 and the space outside the core housing 2. The first opening 113 that is not in use is closed by a lid (not shown).

Similarly, in the heat exchanger core 1 according to some embodiments, the second header space 21 has a polyhedral shape defined by an inner wall surface 2a of the core housing 2 and an outer wall surface 137a of a first inclined wall portion 137, which is a portion of the wall portion defining the first layered header passage 13, which will be described later.

In the heat exchanger core 1 according to some embodiments, a second opening 213 connecting the second header space 21 and the outside of the core housing 2 is formed on each wall portion 2W of the core housing 2 oriented in the first direction Dr1, the second direction Dr2, and the third direction Dr3. The second opening 213 is a communication port for allowing a fluid to flow between the second header space 21 and the space outside the core housing 2. The second opening 213 that is not in use is closed by a lid (not shown).

In the heat exchanger core 1 according to some embodiments, since the first opening 113 and the second opening 213 are formed on each wall portion 2W of the core housing 2 oriented in the first direction Dr1, the second direction Dr2, and the third direction Dr3, tubes can be easily placed regardless of the posture of the heat exchanger core 1.

In the heat exchanger core 1 according to some embodiments, the first header space 11 on the upper side in FIGS. 1, 2B and 3B is disposed on one side along the third direction Dr3 (on the right side in FIGS. 2B and 3B), and the second header space 21 on the upper side in the figures is disposed on the other side along the third direction Dr3 (on the left side in FIGS. 2B and 3B).

In the heat exchanger core 1 according to some embodiments, the first header space 11 on the lower side in FIGS. 1, 2B and 3B is disposed on one side along the third direction Dr3 (on the right side in FIGS. 2B and 3B), and the second header space 21 on the lower side in the figures is disposed on the other side along the third direction Dr3 (on the left side in FIGS. 2B and 3B).

That is, in the heat exchanger core 1 according to some embodiments, the first header space 11 on the upper side in FIGS. 1, 2B and 3B and the first header space 11 on the lower side in the figures are disposed in substantially the same position along the third direction Dr3. Similarly, in the heat exchanger core 1 according to some embodiments, the second header space 21 on the upper side in FIGS. 1, 2B and 3B and the second header space 21 on the lower side in the figures are disposed in substantially the same position along the third direction Dr3.

However, in the heat exchanger core 1 according to some embodiments, the first header space 11 on the upper side in FIGS. 1, 2B and 3B and the first header space 11 on the lower side in the figures may be disposed on the opposite sides along the third direction Dr3. Similarly, in the heat exchanger core 1 according to some embodiments, the second header space 21 on the upper side in FIGS. 1, 2B and 3B and the second header space 21 on the lower side in the figures may be disposed on the opposite sides along the third direction Dr3.

(First Layered Header Passage 13 and Second Layered Header Passage 23)

Each first layered header passage 13 according to some embodiments is a layered passage extending along the reference plane RP which extends in the second direction Dr2 and the third direction Dr3.

Each second layered header passage 23 according to some embodiments is a layered passage extending along the reference plane RP.

In some embodiments, the reference plane RP is parallel to the paper in FIGS. 2B and 3B.

The first layered header passages 13 according to some embodiments are stacked in the direction perpendicular to the reference plane RP, i.e., in the first direction Dr1.

The second layered header passages 23 according to some embodiments are stacked in the first direction Dr1.

More specifically, in the heat exchanger core 1 according to some embodiments, the first layered header passages 13 and the second layered header passages 23 are alternately stacked in the first direction Dr1.

The first layered header passage 13 and the second layered header passage 23 that are adjacent to each other along the first direction Dr1 are separated by an interlayer partition wall 31.

In order to suppress the bending of the interlayer partition walls 31, adjacent interlayer partition walls 31 may be connected to each other by ribs (not shown).

In some embodiments, each interlayer partition wall 31 is formed not only in the region where the first layered header passage 13 and the second layered header passage 23 are present, but also up to the region where the first passage 17 and the second passage 27 are present along the second direction Dr2 to separate the first passage 17 and the second passage 27 that are adjacent to each other in the first direction Dr1.

Each first layered header passage 13 according to some embodiments has a triangular shape when viewed from the first direction Dr1. Each first layered header passage 13 according to some embodiments has a first edge 131 at one of two sides corresponding to the oblique sides of the triangle inclined with respect to the second direction Dr2 and the third direction Dr3, adjacent to the first header space 11. Each first layered header passage 13 according to some embodiments has an open end 135 at the first edge 131. Each first layered header passage 13 according to some embodiments communicates with the first header space 11 through the open end 135.

Each first layered header passage 13 according to some embodiments is separated from the second header space 21 by a first inclined wall portion 137 formed at the other of two sides corresponding to the oblique sides of the triangle.

Each first layered header passage 13 according to some embodiments is connected at the side extending along the third direction Dr3 and corresponding to the bottom side of the triangle to a plurality of first communication ports 151 of a plurality of first communication port rows 15, which will be described later.

Each second layered header passage 23 according to some embodiments has a triangular shape when viewed from the first direction Dr1. Each second layered header passage 23 according to some embodiments has a second edge 231 at one of two sides corresponding to the oblique sides of the triangle inclined with respect to the second direction Dr2 and the third direction Dr3, adjacent to the second header space 21. Each second layered header passage 23 according to some embodiments has an open end 235 at the second edge 231. Each second layered header passage 23 according to some embodiments communicates with the second header space 21 through the open end 235.

Each second layered header passage 23 according to some embodiments is separated from the first header space 11 by a second inclined wall portion 237 formed at the other of two sides corresponding to the oblique sides of the triangle.

Each second layered header passage 23 according to some embodiments is connected at the side extending along the third direction Dr3 and corresponding to the bottom side of the triangle to a plurality of second communication ports 251 of a plurality of second communication port rows 25, which will be described later.

Each first layered header passage 13 and each second layered header passage 23 according to some embodiments are disposed so as to overlap each other in the region corresponding to the triangle when viewed from the first direction Dr1.

Each first layered header passage 13 according to some embodiments communicates with the first header space 11 at the first edge 131 different from the edge at which the first communication port row 15 is disposed. Each second layered header passage 23 according to some embodiments communicates with the second header space 21 at the second edge 231 different from the edge at which the second communication port row 25 is disposed.

The first edge 131 and the second edge 231 are displaced from each other in plan view as viewed from the first direction Dr1.

Each first layered header passage 13 and each second layered header passage according to some embodiments have the same shape in the above-described plan view and communicate with the first header space 11 and the second header space 21 at the first edge 131 and the second edge 132, which are different from each other, respectively. Thus, the first header space 11 and the second header space 21 can be provided separately and independently of each other.

The shapes of the first edge 131 and the second edge 231 may have a shape other than linear in the plan view.

(First Communication Port Row 15 and Second Communication Port Row 25)

As shown in FIG. 4, a plurality of first communication port rows 15 according to some embodiments are arranged in the first direction Dr1 so as to correspond to the plurality of first layered header passages 13, respectively, and each first communication port row 15 is formed by a plurality of first communication ports 151 arranged along the reference plane Rp.

That is, each first communication port row 15 is formed by a plurality of first communication ports 151 arranged along the third direction Dr3. Thus, one first communication port row 15 corresponds to one first layered header passage 13.

As shown in FIG. 4, a plurality of second communication port rows 25 according to some embodiments are arranged in the first direction Dr1 so as to correspond to the plurality of second layered header passages 23, respectively, and each second communication port row 25 is formed by a plurality of second communication ports 251 arranged along the reference plane RP.

That is, each second communication port row 25 is formed by a plurality of second communication ports 251 arranged along the third direction Dr3. Thus, one second communication port row 25 corresponds to one second layered header passage 23.

(First Passage 17 and Second Passage 27)

As shown in FIGS. 2B and 4, each first passage 17 according to some embodiments is a passage communicating with any of the first layered header passages 13 through each first communication port 151. Each first passage 17 according to some embodiments extends along the second direction Dr2.

As shown in FIGS. 3B and 4, each second passage 27 according to some embodiments is a passage communicating with any of the second layered header passages 23 through each second communication port 251. Each second passage 27 according to some embodiments extends along the second direction Dr2.

In some embodiments, two first passages 17 that are adjacent to each other along the third direction Dr3 are separated by an interpassage partition wall 33. Similarly, in some embodiments, two second passages 27 that are adjacent to each other along the third direction Dr3 are separated by an interpassage partition wall 33.

In some embodiments, the first passage 17 and the second passage 27 are adjacent along the first direction Dr1. As described above, in some embodiments, the first passage 17 and the second passage 27 that are adjacent to each other along the first direction Dr1 are separated by the interlayer partition wall 31.

As shown in FIGS. 5A and 5B, in some embodiments, each first passage 17 and each second passage 27 have a rectangular shape in a cross-section perpendicular to the second direction Dr2, and each first passage 17 has the same shape as each second passage 27. In some embodiments, in each first passage 17 and each second passage 27, the dimension along the third direction Dr3 is larger than the dimension along the first direction Dr1, but the dimension along the third direction Dr3 may be the same as the dimension along the first direction Dr1, or the dimension along the third direction Dr3 may be smaller than the dimension along the first direction Dr1. Further, each first passage 17 and each second passage 27 may have a shape other than rectangular.

As shown in FIGS. 5A and 5B, in some embodiments, the first passages 17 and the second passage 27 are arranged along the first direction Dr1 and the third direction Dr3. As shown in FIGS. 5A and 5B, in some embodiments, the first passages 17 and the second passages 27 are arranged alternately along the first direction Dr1.

As shown in FIG. 5A, in the heat exchanger core 1 according to one embodiment, passage rows each of which is composed of a plurality of first passages 17 arranged along the third direction Dr3 and passage rows each of which is composed of a plurality of second passages 27 arranged along the third direction Dr3 are alternated along the first direction Dr1.

As shown in FIG. 5B, in the heat exchanger core 1 according to the other embodiment, the first passages 17 and the second passages 27 are arranged alternately along the third direction Dr3. In other words, as shown in FIG. 5B, in the heat exchanger core 1 according to the other embodiment, the first passages 17 and the second passages 27 form a checkered pattern in a cross-section perpendicular to the second direction Dr2. The configuration in which the first passages 17 and the second passages 27 form a checkered pattern in a cross-section perpendicular to the second direction Dr2 will be described later.

As shown in FIGS. 5A and 5B, in some embodiments, two passages 17, 27 that are adjacent along the third direction Dr3 face each other along the short sides of the rectangles via the interpassage partition wall 33. As shown in FIGS. 5A and 5B, in some embodiments, two passages 17, 27 that are adjacent along the first direction Dr1 face each other along the long sides of the rectangles via the interlayer partition wall 31.

(Flow of Fluid)

In the heat exchanger core 1 according to the above-described embodiments, the first fluid and the second fluid flow inside the heat exchanger core 1 as described later. For convenience of explanation, it is assumed that the first fluid is introduced into the first header space 11 on the upper side in FIGS. 1, 2B and 3B. Further, it is assumed that the second fluid is introduced into the second header space 21 on the lower side in FIGS. 1, 2B and 3B. In this case, the flows of the first and second fluids in the heat exchanger core 1 are countercurrent, as described below.

(Flow of First Fluid)

The first fluid is introduced into the first header space 11 on the upper side in FIGS. 1, 2B, and 3B through any of the first openings 113 formed in the upper portion of the core housing 2 in FIGS. 1, 2B, and 3B.

The first fluid introduced into the first header space 11 flows into each first layered header passage 13 on the upper side in FIGS. 1, 2B and 3B through each open end 135 facing the first header space 11. That is, the first fluid introduced into the first header space 11 is distributed to each first layered header passage 13.

The first fluid introduced into each first layered header passage 13 flows through the first layered header passage 13 and is introduced into the first passages 17 through the plurality of first communication ports 151 of each first communication port row 15 on the upper side in FIGS. 1, 2B and 3B. That is, the first fluid introduced into each first layered header passage 13 is further distributed to each first passage 17.

The first fluid introduced into each first passage 17 flows downward in FIGS. 1, 2B, and 3B through the first passage 17 and is introduced into each first layered header passage 13 on the lower side in FIGS. 1, 2B, and 3B through the plurality of first communication ports 151 of each first communication port row 15 on the lower side in FIGS. 1, 2B and 3B.

The first fluid introduced into the first layered header passage 13 flows into the first header space 11 on the lower side in FIGS. 1, 2B and 3B through each open end 135 facing the first header space 11.

The first fluid introduced into the first header space 11 is discharged to the outside through any of the first openings 113 formed in the lower portion of the core housing 2 in FIGS. 1, 2B, and 3B.

(Flow of Second Fluid)

The second fluid is introduced into the second header space 21 on the lower side in FIGS. 1, 2B, and 3B through any of the second openings 213 formed in the lower portion of the core housing 2 in FIGS. 1, 2B, and 3B.

The second fluid introduced into the second header space 21 flows into each second layered header passage 23 on the lower side in FIGS. 1, 2B and 3B through each open end 235 facing the second header space 21. That is, the second fluid introduced into the second header space 21 is distributed to each second layered header passage 23.

The second fluid introduced into each second layered header passage 23 flows through the second layered header passage 23 and is introduced into the second passages 27 through the plurality of second communication ports 251 of each second communication port row 25 on the lower side in FIGS. 1, 2B and 3B. That is, the second fluid introduced into each second layered header passage 23 is further distributed to each second passage 27.

The second fluid introduced into each second passage 27 flows upward in FIGS. 1, 2B, and 3B through the second passage 27 and is introduced into each second layered header passage 23 on the upper side in FIGS. 1, 2B, and 3B through the plurality of second communication ports 251 of each second communication port row 25 on the upper side in FIGS. 1, 2B and 3B.

The second fluid introduced into the second layered header passage 23 flows into the second header space 21 on the upper side in FIGS. 1, 2B and 3B through each open end 235 facing the second header space 21.

The second fluid introduced into the second header space 21 is discharged to the outside through any of the second openings 213 formed in the upper portion of the core housing 2 in FIGS. 1, 2B, and 3B.

In the case where the second fluid is introduced into the second header space 21 on the upper side in FIGS. 2B and 3B, the flows of the first and second fluids in the heat exchanger core 1 are parallel.

(Heat Exchange in Heat Exchanger Core 1)

In the heat exchanger core 1 according to some embodiments, the first fluid flowing through each first passage 17 downward in FIGS. 1, 2B and 3B, and the second fluid flowing through each second passage 27 upward in FIGS. 1, 2B and 3B exchange heat via the interlayer partition wall 31. Additionally, in the heat exchanger core 1 according to the other embodiment shown in FIG. 5B, the first fluid flowing through each first passage 17 downward in FIGS. 1, 2B and 3B, and the second fluid flowing through each second passage 27 upward in FIGS. 1, 2B and 3B further exchange heat via the interpassage partition wall 33.

Further, in the heat exchanger core 1 according to some embodiments, the first fluid flowing through each first layered header passage 13 on the upper side in FIGS. 1, 2B and 3B, and the second fluid flowing through each second layered header passage 23 on the upper side in FIGS. 1, 2B and 3B exchange heat via the interlayer partition wall 31.

Similarly, in the heat exchanger core 1 according to some embodiments, the first fluid flowing through each first layered header passage 13 on the lower side in FIGS. 1, 2B and 3B, and the second fluid flowing through each second layered header passage 23 on the lower side in FIGS. 1, 2B and 3B exchange heat via the interlayer partition wall 31.

With the heat exchanger core 1 according to the above-described embodiments, since the first layered header passages 13 are interposed between the first header space 11 and the plurality of first passages 17, it is possible to promote the distribution of the fluid in the stacking direction of the first layered header passages 13, i.e., the perpendicular direction (first direction Dr1) to the reference plane RP, and suppress the variation in the flow rate between the first passages 17 in the first direction Dr1. Thus, it is possible to achieve the heat exchanger core 1 with excellent heat exchange efficiency.

Additionally, with the heat exchanger core 1 according to the above-described embodiments, since the second layered header passages 23 are interposed between the second header space 21 and the plurality of second passages 27, it is possible to promote the distribution of the fluid in the stacking direction of the second layered header passages 23, i.e., the perpendicular direction (first direction Dr1) to the reference plane RP, and suppress the variation in the flow rate between the second passages 27 in the first direction Dr1. Thus, it is possible to achieve the heat exchanger core 1 with excellent heat exchange efficiency.

As described above, in the heat exchanger core 1 according to some embodiments, the plurality of first layered header passages 13 and the plurality of second layered header passages 23 are alternately stacked in the first direction Dr1. Further, in the heat exchanger core 1 according to some embodiments, the plurality of first communication port rows 15 and the plurality of second communication port rows 25 are arranged alternately in the first direction Dr1.

Accordingly, heat is easily transferred between the first layered header passage 13 and the second layered header passage 23 that are adjacent to each other, so that heat can be exchanged between the first fluid flowing through the first layered header passage 13 and the second fluid flowing through the second layered header passage 23. This allows efficient use of the volume of the heat exchanger core 1 and contributes to downsizing the heat exchanger core 1. Additionally, with the heat exchanger core 1 according to the above-described embodiments, since the plurality of first communication port rows 15 and the plurality of second communication port rows 25 are arranged alternately in the first direction Dr1, the arrangement of the first communication port rows 15 and the second communication port rows 25 is reasonable to perform heat exchange between the first fluid flowing through each first passage 17 and the second fluid flowing through each second passage 27 with the first passages 17 and the second passages 27 being adjacent to each other.

As described above, in the heat exchanger core 1 according to some embodiments, the plurality of first layered header passages 13 and the plurality of second layered header passages 23 are disposed so as to overlap each other in plan view as viewed from the first direction Dr1. The first header space 11 is disposed outside the arrangement region of the second header space 21 in the plan view.

Thus, the first header space 11 and the second header space 21 arranged in different arrangement regions in the plan view communicate with the plurality of first layered header passages 13 and the plurality of second layered header passages 23 overlapping in the plan view, respectively. Thus, it is possible to reduce the dimension of the heat exchanger core 1 along the first direction Dr1.

As described above, in the heat exchanger core 1 according to some embodiments, the first header space 11 has a polyhedral shape including the first edge 131 as one face. The second header space 21 has a polyhedral shape including the second edge 231 as one face.

As described above, in the heat exchanger core 1 according to some embodiments, the first header space 11 having a polyhedral shape communicates with the plurality of first layered header passages 13 through the open ends 135 at one face of the polyhedron. Therefore, when the heat exchanger core 1 is configured such that the inner wall surface 2a of the wall portion 2W that forms the outer surface of the heat exchanger core 1 also serves as another face of the first header space 11, for example, the first header space 11 can be efficiently provided in the heat exchanger core 1.

Further, as described above, in the heat exchanger core 1 according to some embodiments, the second header space 21 having a polyhedral shape communicates with the plurality of second layered header passages 23 through the open ends 235 at one face of the polyhedron. Therefore, when the heat exchanger core 1 is configured such that the inner wall surface 2a of the wall portion 2W that forms the outer surface of the heat exchanger core 1 also serves as another face of the second header space 21, for example, the second header space 21 can be efficiently provided in the heat exchanger core 1.

In the heat exchanger core 1 according to some embodiments, the plurality of first layered header passages 13 may be disposed in an arrangement area 175 (see FIGS. 2A and 3A) of the plurality of first passages 17 when viewed along the extension direction of the plurality of first passages 17 (second direction Dr2). Similarly, in the heat exchanger core 1 according to some embodiments, the plurality of second layered header passages 23 may be disposed in an arrangement area 275 (see FIGS. 2A and 3A) of the plurality of second passages 27 when viewed along the extension direction of the plurality of second passages 27 (second direction Dr2).

Thus, it is possible to reduce the dimensions of the heat exchanger core 1 in the direction perpendicular to the extension direction of the first passages 17 and in the direction perpendicular to the extension direction of the second passages 27.

In the heat exchanger core 1 according to some embodiments, the first header space 11 may overlap at least a portion of the arrangement area 175 of the plurality of first passages 17 when viewed along the extension direction of the plurality of first passages 17 (second direction Dr2). Similarly, in the heat exchanger core 1 according to some embodiments, the second header space 21 may overlap at least a portion of the arrangement area 275 of the plurality of second passages 27 when viewed along the extension direction of the plurality of second passages 27 (second direction Dr2).

Thus, it is possible to reduce the dimensions of the heat exchanger core 1 in the direction perpendicular to the extension direction of the first passages 17 and in the direction perpendicular to the extension direction of the second passages 27.

In the heat exchanger core 1 according to some embodiments, the first header space 11 may overlap at least a portion of a first range 136 (see FIGS. 2A and 3A) occupied by the plurality of first layered header passages 13 when viewed along the extension direction of the plurality of first passages 17 (second direction Dr2). Similarly, in the heat exchanger core 1 according to some embodiments, the second header space 21 may overlap at least a portion of a second range 236 (see FIGS. 2A and 3A) occupied by the plurality of second layered header passages 23 when viewed along the extension direction of the plurality of second passages 27 (second direction Dr2).

Thus, it is possible to reduce the dimensions of the heat exchanger core 1 in the direction perpendicular to the extension direction of the first passages 17 and in the direction perpendicular to the extension direction of the second passages 27.

With the heat exchanger 10 including the heat exchanger core 1 according to some embodiments, it is possible to achieve the heat exchanger 10 with excellent heat exchange efficiency.

(Passage Configuration in Checkered Pattern)

Figure 6:
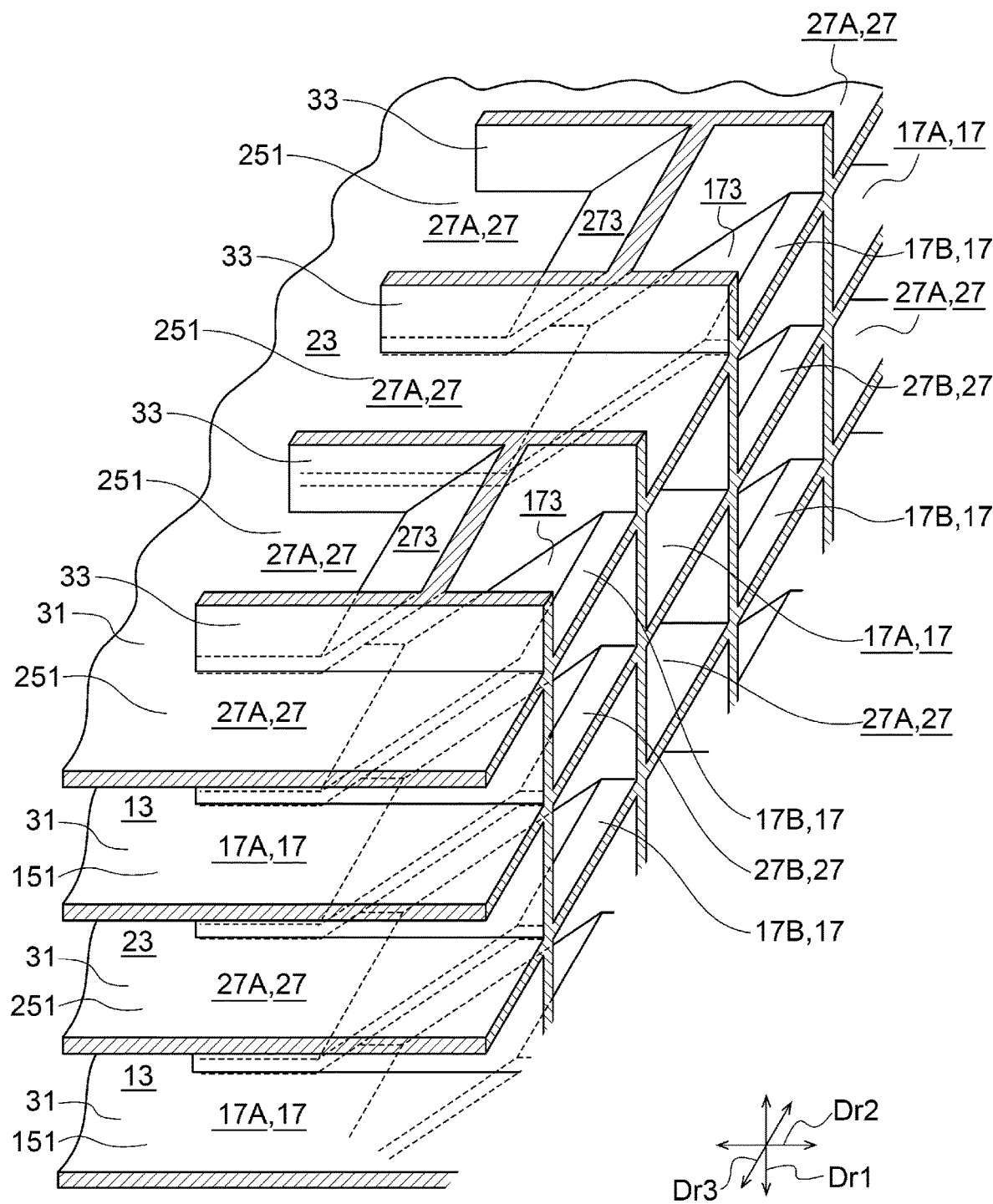
FIG. 6 is a schematic perspective cross-sectional view of a region from a first layered header passage to a first passage and a region from a second layered header passage to a second passage.

The configuration in which the first passages 17 and the second passages 27 form a checkered pattern in a cross-section perpendicular to the second direction Dr2 in the heat exchanger core 1 according to the above-described other embodiment will now be described. FIG. 6 is a schematic perspective cross-sectional view of a region from the first layered header passage 13 to the first passage 17 and a region from the second layered header passage 23 to the second passage 27. FIG. 6 is drawn so that the cut sections of non-offset passages 17A and 27A, which will be described later, cut along the second direction Dr2 appear on the front side of the figure.

Figure 7:
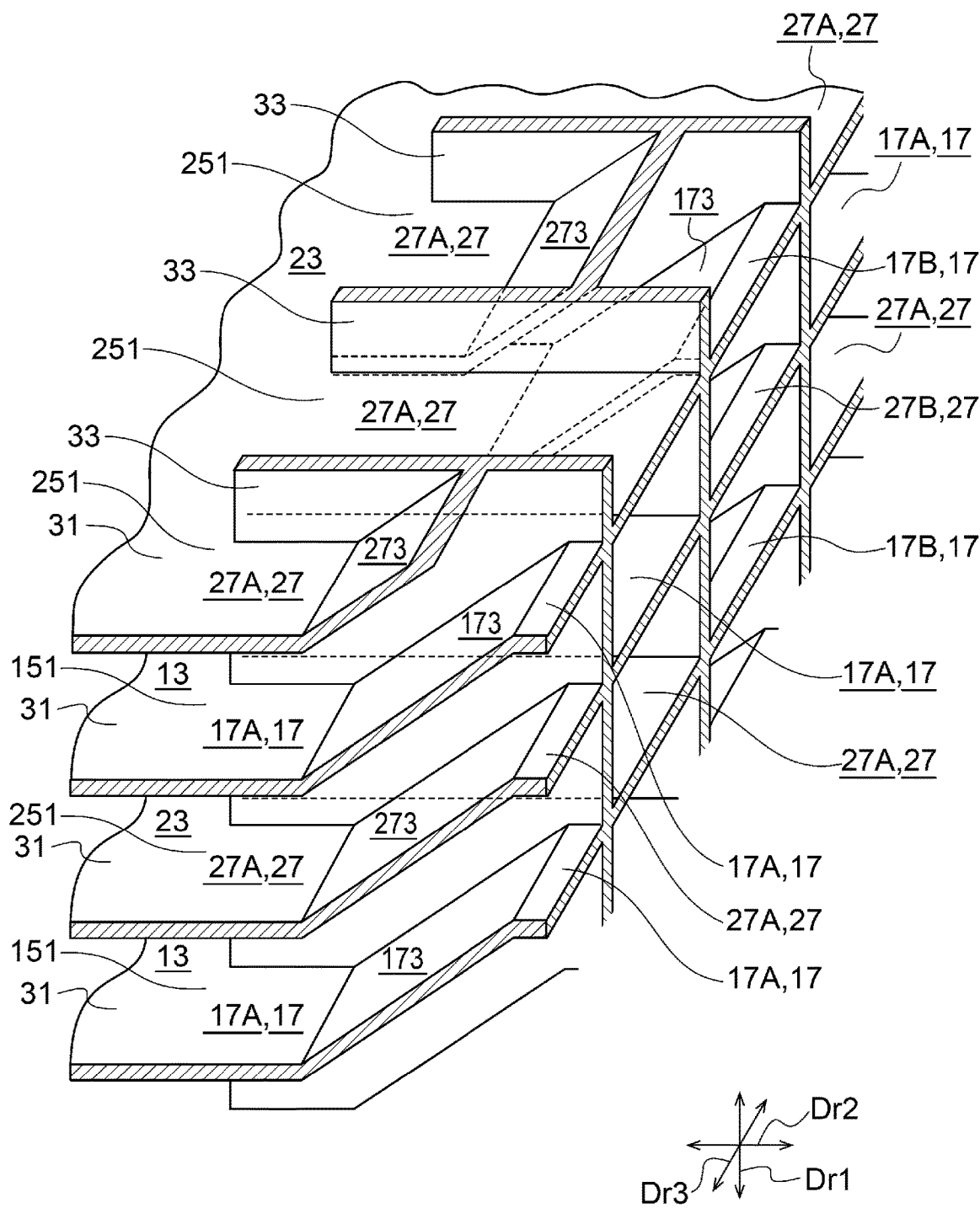
FIG. 7 is a schematic perspective cross-sectional view of a region from a first layered header passage to a first passage and a region from a second layered header passage to a second passage.

FIG. 7 is a schematic perspective cross-sectional view of a region from the first layered header passage 13 to the first passage 17 and a region from the second layered header passage 23 to the second passage 27. FIG. 7 is drawn so that the cut sections of offset passages 17B and 27B, which will be described later, cut along the second direction Dr2 appear on the front side of the figure.

In the heat exchanger core 1 according to the other embodiment, among the plurality of first passages 17, the first passage 17 that is connected to the first communication port 151 and disposed at a position displaced in the first direction Dr1 from the first communication port 151 has a first transition section 173 formed such that a position with respect to the first communication port 151 is gradually displaced in the first direction Dr1 from the first communication port 151 toward the first passage 17. Similarly, in the heat exchanger core 1 according to the other embodiment, among the plurality of second passages 27, the second passage 27 that is connected to the second communication port 251 and disposed at a position displaced in the first direction Dr1 from the second communication port 251 has a second transition section 273 formed such that a position with respect to the second communication port 251 is gradually displaced in the first direction Dr1 from the second communication port 251 toward the second passage 27.

In the following description, among the plurality of first passages 17, the first passage 17 that is connected to the first communication port 151 and disposed at a position displaced in the first direction Dr1 from the first communication port 151 is also referred to as an offset first passage 17B, and the first passage 17 that is disposed at a position not displaced in the first direction Dr1 from the first communication port 151 is also referred to as a non-offset first passage 17A.

Further, among the plurality of second passages 27, the second passage 27 that is connected to the second communication port 251 and disposed at a position displaced in the first direction Dr1 from the second communication port 251 is also referred to as an offset second passage 27B, and the second passage 27 that is disposed at a position not displaced in the first direction Dr1 from the second communication port 251 is also referred to as a non-offset second passage 27A.

When the non-offset first passage 17A and the non-offset second passage 27A are not particularly distinguished, they are also simply referred to as non-offset passages 17A, 27A. Similarly, when the offset first passage 17B and the offset second passage 27B are not particularly distinguished, they are also simply referred to as offset passages 17B, 27B.

Further, when the first transition section 173 and the second transition section 273 are not particularly distinguished, they are also simply referred to as transition sections 173, 273.

That is, in the heat exchanger core 1 according to the other embodiment, the offset first passage 17B has the first transition section 173, and the offset second passage 27B has the second transition section 273.

The non-offset first passage 17A shall include the first passage 17 that exists at a position not displaced in the first direction Dr1 from the first communication port 151 connected to the first passage 17 and a section of the first passage 17 that exists at a position not displaced in the first direction Dr1 from the first communication port 151 connected to the first passage 17.

The offset first passage 17B shall include a section of the first passage 17 that exists at a position displaced in the first direction Dr1 from the first communication port 151 connected to the first passage 17 and the first transition section 173.

The non-offset second passage 27A shall include the second passage 27 that exists at a position not displaced in the first direction Dr1 from the second communication port 251 connected to the second passage 27 and a section of the second passage 27 that exists at a position not displaced in the first direction Dr1 from the second communication port 251 connected to the second passage 27.

The offset second passage 27B shall include a section of the second passage 27 that exists at a position displaced in the first direction Dr1 from the second communication port 251 connected to the second passage 27 and the second transition section 273.

That is, in the heat exchanger core 1 according to the other embodiment, the first passage 17 includes two types of passages, namely, a passage composed of only the non-offset first passage 17A, and a passage composed of the non-offset first passage 17A, the first transition section 173, and the offset first passage 17B.

Similarly, in the heat exchanger core 1 according to the other embodiment, the second passage 27 includes two types of passages, namely, a passage composed of only the non-offset second passage 27A, and a passage composed of the non-offset second passage 27A, the second transition section 273, and the offset second passage 27B.

As shown in FIGS. 6 and 7, in the heat exchanger core 1 according to the other embodiment, each first transition section 173 is configured to be displaced to one side (the upper side in FIGS. 6 and 7) along the first direction Dr1 as it extends along the second direction Dr2 from the first communication port 151 toward the inside of the first passage 17, i.e., from the non-offset first passage 17A toward the offset first passage 17B.

Similarly, as shown in FIGS. 6 and 7, in the heat exchanger core 1 according to the other embodiment, each second transition section 273 is configured to be displaced to one side (the upper side in FIGS. 6 and 7) along the first direction Dr1 as it extends along the second direction Dr2 from the second communication port 251 toward the inside of the second passage 27, i.e., from the non-offset second passage 27A toward the offset second passage 27B.

As shown in FIGS. 6 and 7, in the heat exchanger core 1 according to the other embodiment, the first passage 17 and the second passage 27 that do not have the offset passages 17B, 27B, i.e., composed of only the non-offset passages 17A, 17B are stacked alternately along the first direction Dr1 at the same position in the third direction Dr3.

Further, as shown in FIGS. 6 and 7, in the heat exchanger core 1 according to the other embodiment, the first passage 17 and the second passage 27 that have the offset passages 17B, 27B, i.e., composed of the non-offset passages 17A, 27A, the transition sections 173, 273, and the offset passages 17B, 27B are stacked alternately along the first direction Dr1 at the same position in the third direction Dr3.

In the heat exchanger core 1 according to the other embodiment, with the provision of the transition sections 173, 273, the positions of the offset passages 17B, 27B along the first direction Dr1 are displaced with respect to the first communication port 151 or the second communication port 251 to which these passages are connected, respectively.

In the heat exchanger core 1 according to the other embodiment, with the provision of the transition sections 173, 273, the checkered passage can be formed without a portion that causes pressure loss such as a junction between passages, so that the occurrence of extra pressure loss can be suppressed.

In the heat exchanger core 1 having such configuration according to the other embodiment shown in FIG. 5B, in each first communication port row 15, the first passage 17 that is disposed at substantially the same position as the first communication port 151 (i.e., the passage composed of only the non-offset first passage 17A) and the first passage 17 that is disposed at a position displaced in the first direction Dr1 from the first communication port 151 (i.e., the offset first passage 17B) are alternately arranged one after another when viewed along the second direction Dr2.

Similarly, in the heat exchanger core 1 according to the other embodiment shown in FIG. 5B, in each second communication port row 25, the second passage 27 that is disposed at substantially the same position as the second communication port 251 (i.e., the passage composed of only the non-offset second passage 27A) and the second passage 27 that is disposed at a position displaced in the first direction Dr1 from the second communication port 251 (i.e., the offset second passage 27B) are alternately arranged one after another when viewed along the second direction Dr2.

Thus, with the heat exchanger core 1 according to the other embodiment shown in FIG. 5B, since the second passage 27 that is displaced in the first direction Dr1 from the second communication port 251 (i.e., the offset second passage 27B) is placed in a space created by the displacement in the first direction Dr1 from the first communication port 151, the region where the first passage 17 and the second passage 27 are adjacent to each other can be increased. As a result, heat exchange between the first fluid flowing through the first passage 17 and the second fluid flowing through the second passage 27 becomes easier, so that the heat exchange efficiency can be further improved.

In the heat exchanger core 1 according to the other embodiment shown in FIG. 5B, the arrangement position of at least part of the plurality of first passages 17 along the first direction Dr1 is substantially the same as the second passage 27 that is disposed on at least one of one side or the other side of the first passage 17 along the third direction Dr3.

Specifically, in the heat exchanger core 1 according to the other embodiment shown in FIG. 5B, the displacement amount (offset amount $\Delta L$) by which the offset passages 17B, 27B are displaced along the first direction Dr1 from the non-offset passages 17A, 27A through the transition sections 173, 273 is equal to a separation pitch L1 between the first passage 17 and the second passage 27 that are adjacent to each other along the first direction Dr1.

The offset amount $\Delta L$ may be less than the separation pitch L1 between the first passage 17 and the second passage 27. For example, at least part of the plurality of first passages 17 may at least partially overlap along the first direction Dr1 the second passage 27 that is disposed on at least one of one side or the other side along the third direction Dr3.

Thereby, heat is easily transferred between the first passage 17 and the second passage 27 in the region where the first passage 17 and the second passage 27 overlap each other along the perpendicular direction (first direction Dr1) to the reference plane RP, and heat exchange between the first fluid flowing through the first passage 17 and the second fluid flowing through the second passage 27 becomes easy, so that the heat exchange efficiency can be improved.

Thus, in the heat exchanger core 1 according to the other embodiment shown in FIG. 5B, since the first passage 17 and the second passage 27 that are adjacent in the third direction Dr3 are in the same arrangement position along the first direction Dr1, the region where the first passage 17 and the second passage 27 overlap each other along the first direction Dr1 can be further increased. As a result, heat is more easily transferred between the first passage 17 and the second passage 27, and heat exchange between the first fluid flowing through the first passage 17 and the second fluid flowing through the second passage 27 becomes easier, so that the heat exchange efficiency can be further improved.

Further, in the heat exchanger core 1 according to the other embodiment shown in FIG. 5B, at least part of the plurality of first passages 17 is sandwiched between two second passages 27 disposed on one side and the other side along the third direction Dr3 and is sandwiched between two second passages 27 disposed on one side and the other side of the first passage 17 in the first direction Dr1.

Thus, in the heat exchanger core 1 according to the other embodiment shown in FIG. 5B, heat is more easily transferred between the first passage 17 and the second passage 27. As a result, heat exchange between the first fluid flowing through the first passage 17 and the second fluid flowing through the second passage 27 becomes easier, so that the heat exchange efficiency can be further improved.

In the heat exchanger core 1 according to the other embodiment shown in FIG. 5B, since the positions of the first passage 17 and the second passage 27 are gradually displaced in the first transition section 173 and the second transition section 273, the pressure loss of the fluid in the first transition section 173 and the second transition section 273 can be suppressed.

The heat exchanger core 1 according to the above-described embodiments may be produced by stacking plates or by casting, for example, but it is preferable that the heat exchanger core 1 is produced by additive manufacturing using metal powder as a raw material. In this case, the heat exchanger core 1 is an additive manufactured body of metal powder. The metal powder used for additive manufacturing the heat exchanger core 1 is not particularly limited, but powder of stainless steel or titanium may be used.

Since the structures of the regions defining the first header space 11 and the second header space 21 are not as complicated as the other portions of the heat exchanger core 1, they may be produced by casting or the like, or may be produced by additive manufacturing with metal powder in the same way as the other portions. Further, they may be formed integrally with the other portions by additive manufacturing.

The present disclosure is not limited to the embodiments described above, but includes modifications to the embodiments described above, and embodiments composed of combinations of those embodiments.

The contents described in the above embodiments would be understood as follows, for instance.

(1) A heat exchanger core 1 according to at least one embodiment of the present disclosure includes a first header space 11, a plurality of first layered header passages 13, a plurality of first communication port rows 15, and a plurality of first passages 17.

The plurality of first layered header passages 13 are stacked in a direction perpendicular to a reference plane RP such that each first layered header passage 13 extends along the reference plane RP. Each first layered header passage 13 has an open end 135 at a first edge 131 adjacent to the first header space 11 and communicates with the first header space 11 through the open end 135.

The plurality of first communication port rows 15 are arranged in the perpendicular direction so as to correspond to the plurality of first layered header passages 13, respectively, and each first communication port row 15 is formed by a plurality of first communication ports 151 arranged along the reference plane RP.

The plurality of first passages 17 communicate with any of the first layered header passages 13 through the plurality of first communication ports 151.

With the above configuration (1), since the first layered header passages 13 are interposed between the first header space 11 and the plurality of first passages 17, it is possible to promote the distribution of the fluid in the stacking direction of the first layered header passages 13, i.e., the perpendicular direction (first direction Dr1) to the reference plane RP, and suppress the variation in the flow rate between the first passages 17 in the first direction Dr1. Thus, it is possible to achieve the heat exchanger core 1 with excellent heat exchange efficiency.

(2) In some embodiments, in the above configuration (1), the heat exchanger core includes a second header space 21, a plurality of second layered header passages 23, a plurality of second communication port rows 25, and a plurality of second passages 27.

The second header space 21 does not communicate with the first header space 11.

The plurality of second layered header passages 23 are stacked in the perpendicular direction to the reference plane RP such that each second layered header passage 23 extends along the reference plane RP. Each second layered header passage 23 has an open end 235 at a second edge 231 adjacent to the second header space 21 and communicates with the second header space 21 through the open end 235.

The plurality of second communication port rows 25 are arranged in the perpendicular direction so as to correspond to the plurality of second layered header passages 23, respectively, and each second communication port row 25 is formed by a plurality of second communication ports 251 arranged along the reference plane RP.

The plurality of second passages 27 communicate with any of the second layered header passages 23 through the plurality of second communication ports 251.

With the above configuration (2), since the second layered header passages 23 are interposed between the second header space 21 and the plurality of second passages 27, it is possible to promote the distribution of the fluid in the stacking direction of the second layered header passages 23, i.e., the perpendicular direction (first direction Dr1) to the reference plane RP, and suppress the variation in the flow rate between the second passages 27 in the first direction Dr1. Thus, it is possible to achieve the heat exchanger core 1 with excellent heat exchange efficiency.

(3) In some embodiments, in the above configuration (2), the plurality of first layered header passages 13 and the plurality of second layered header passages 23 are alternately stacked in the perpendicular direction.

The plurality of first communication port rows 15 and the plurality of second communication port rows 25 are arranged alternately in the perpendicular direction.

With the above configuration (3), heat is easily transferred between the first layered header passage 13 and the second layered header passage 23 that are adjacent to each other, so that heat can be exchanged between the fluid flowing through the first layered header passage 13 and the fluid flowing through the second layered header passage 23. This allows efficient use of the volume of the heat exchanger core 1 and contributes to downsizing the heat exchanger core 1. Additionally, with the above configuration (3), since the plurality of first communication port rows 15 and the plurality of second communication port rows 25 are arranged alternately in the perpendicular direction, the arrangement of the first communication port rows 15 and the second communication port rows 25 is reasonable to perform heat exchange between the fluid flowing through each first passage 17 and the fluid flowing through each second passage 27 with the first passages 17 and the second passages 27 being adjacent to each other.

(4) In some embodiments, in the above configuration (3), the plurality of first layered header passages 13 and the plurality of second layered header passages 23 are disposed so as to overlap each other in plan view as viewed from the perpendicular direction. The first header space 11 is disposed outside the arrangement region of the second header space 21 in the plan view.

With the above configuration (4), the first header space 11 and the second header space 21 arranged in different arrangement regions in the plan view communicate with the plurality of first layered header passages 13 and the plurality of second layered header passages 23 overlapping in the plan view, respectively. Thus, it is possible to reduce the dimension of the heat exchanger core 1 along the perpendicular direction.

(5) In some embodiments, in any one of the above configurations (2) to (4), the first header space 11 has a polyhedral shape including the first edge 131 as one face. The second header space 21 has a polyhedral shape including the second edge 231 as one face.

With the above configuration (5), the first header space 11 having a polyhedral shape communicates with the plurality of first layered header passages 13 through the open ends 135 at one face of the polyhedron. Therefore, when the heat exchanger core 1 is configured such that the inner wall surface 2a of the wall portion 2W that forms the outer surface of the heat exchanger core 1 also serves as another face of the first header space 11, for example, the first header space 11 can be efficiently provided in the heat exchanger core 1.

Similarly with the above configuration (5), the second header space 21 having a polyhedral shape communicates with the plurality of second layered header passages 23 through the open ends 235 at one face of the polyhedron. Therefore, when the heat exchanger core 1 is configured such that the inner wall surface 2a of the wall portion 2W that forms the outer surface of the heat exchanger core 1 also serves as another face of the second header space 21, for example, the second header space 21 can be efficiently provided in the heat exchanger core 1.

(6) In some embodiments, in any one of the above configurations (2) to (5), the plurality of first layered header passages 13 is disposed in an arrangement area 175 of the plurality of first passages 17 when viewed along an extension direction of the plurality of first passages 17. The plurality of second layered header passages 23 is disposed in an arrangement area 275 of the plurality of second passages 27 when viewed along an extension direction of the plurality of second passages 27.

With the above configuration (6), it is possible to reduce the dimensions of the heat exchanger core 1 in the direction perpendicular to the extension direction of the first passages 17 and in the direction perpendicular to the extension direction of the second passages 27.

(7) In some embodiments, in any one of the above configurations (2) to (6), the first header space 11 overlaps at least a portion of an arrangement area 175 of the plurality of first passages 17 when viewed along an extension direction of the plurality of first passages 17. The second header space 21 overlaps at least a portion of an arrangement area 275 of the plurality of second passages 27 when viewed along an extension direction of the plurality of second passages 27.

With the above configuration (7), it is possible to reduce the dimensions of the heat exchanger core 1 in the direction perpendicular to the extension direction of the first passages 17 and in the direction perpendicular to the extension direction of the second passages 27.

(8) In some embodiments, in any one of the above configurations (2) to (7), the first header space 11 overlaps at least a portion of a range (first range 136) occupied by the plurality of first layered header passages 13 when viewed along an extension direction of the plurality of first passages 17. The second header space 21 overlaps at least a portion of a range (second range 236) occupied by the plurality of second layered header passages 23 when viewed along an extension direction of the plurality of second passages 27.

With the above configuration (8), it is possible to reduce the dimensions of the heat exchanger core in the direction perpendicular to the extension direction of the first passages 17 and in the direction perpendicular to the extension direction of the second passages 27.

(9) In some embodiments, in any one of the above configurations (2) to (8), at least part of the plurality of first passages 17 overlaps along the perpendicular direction the second passage 27 that is disposed on at least one of one side or another side along an arrangement direction of the plurality of first communication ports 151 in each first communication port row 15.

With the above configuration (9), heat is easily transferred between the first passage 17 and the second passage 27 in the region where the first passage 17 and the second passage 27 overlap each other along the perpendicular direction to the reference plane RP, and heat exchange between the fluid flowing through the first passage 17 and the fluid flowing through the second passage 27 becomes easy, so that the heat exchange efficiency can be improved.

(10) In some embodiments, in the above configuration (9), at least part of the plurality of first passages 17 is substantially in the same arrangement position along the perpendicular direction as the second passage 27 that is disposed on at least one of the one side or the another side.

With the above configuration (10), since the region where the first passage 17 and the second passage 27 overlap each other along the perpendicular direction to the reference plane RP is increased, heat is more easily transferred between the first passage 17 and the second passage 27. As a result, heat exchange between the fluid flowing through the first passage 17 and the fluid flowing through the second passage 27 becomes easier, so that the heat exchange efficiency can be further improved.

(11) In some embodiments, in the above configuration (10), at least part of the plurality of first passages 17 is sandwiched between two second passages 27 disposed on the one side and the another side and is sandwiched between two second passages 27 disposed on one side and another side of the first passage 17 in the perpendicular direction.

With the above configuration (11), heat is more easily transferred between the first passage 17 and the second passage 27. As a result, heat exchange between the fluid flowing through the first passage 17 and the fluid flowing through the second passage 27 becomes easier, so that the heat exchange efficiency can be further improved.

(12) In some embodiments, in any one of the above configurations (9) to (11), in each first communication port row 15, the first passage 17 that is disposed at substantially the same position as the first communication port 151 and the first passage 17 that is disposed at a position displaced in the perpendicular direction from the first communication port 151 are alternately arranged one after another when viewed along an extension direction of the first passages 17. In each second communication port row 25, the second passage 27 that is disposed at substantially the same position as the second communication port 251 and the second passage 27 that is disposed at a position displaced in the perpendicular direction from the second communication port 251 are alternately arranged one after another when viewed along an extension direction of the second passages 27.

With the above configuration (12), since the second passage 27 that is displaced in the perpendicular direction from the second communication port 251 is placed in a space created by the displacement in the perpendicular direction from the first communication port 151, the region where the first passage 17 and the second passage 27 are adjacent to each other can be increased. As a result, heat exchange between the fluid flowing through the first passage 17 and the fluid flowing through the second passage 27 becomes easier, so that the heat exchange efficiency can be further improved.

(13) In some embodiments, in the above configuration (12), among the plurality of first passages 17, the first passage 17 that is connected to the first communication port 151 and disposed at a position displaced in the perpendicular direction from the first communication port 151 has a first transition section 173 formed such that a position with respect to the first communication port 151 is gradually displaced in the perpendicular direction from the first communication port 151 toward the first passage 17. Among the plurality of second passages 27, the second passage 27 that is connected to the second communication port 251 and disposed at a position displaced in the perpendicular direction from the second communication port 251 has a second transition section 273 formed such that a position with respect to the second communication port 251 is gradually displaced in the perpendicular direction from the second communication port 251 toward the second passage 27.

With the above configuration (13), since the positions of the first passage 17 and the second passage 27 are gradually displaced in the first transition section 173 and the second transition section 273, the pressure loss of the fluid in the first transition section 173 and the second transition section 273 can be suppressed.

(14) A heat exchanger 10 according to at least one embodiment of the present disclosure is provided with: the heat exchanger core 1 having any one of the above configurations (1) to (13).

With the configuration (14), it is possible to achieve the heat exchanger 10 with excellent heat exchange efficiency.

REFERENCE SIGNS LIST

1 Heat exchanger core
10 Heat exchanger
11 First header space
13 First layered header passage
15 First communication port row
17 First passage
21 Second header space
23 Second layered header passage
25 Second communication port row
27 Second passage
113 First opening
131 First edge
135 Open end
151 First communication port
213 Second opening
231 Second edge
235 Open end
251 Second communication port

The invention claimed is:

1. A heat exchanger core, comprising:
a first header space;
a plurality of first layered header passages stacked in a first direction which is a perpendicular direction to a reference plane such that each first layered header passage extends along the reference plane, wherein each first layered header passage has an open end at a first edge adjacent to the first header space and communicates with the first header space through the open end;
a plurality of first communication port rows arranged in the first direction so as to correspond to the plurality of first layered header passages, respectively, wherein each first communication port row is formed by a plurality of first communication ports arranged along the reference plane;
a plurality of first passages communicating with any of the first layered header passages through the plurality of first communication ports;
a second header space which does not communicate with the first header space;
a plurality of second layered header passages stacked in the first direction such that each second layered header passage extends along the reference plane, wherein each second layered header passage has an open end at a second edge adjacent to the second header space and communicates with the second header space through the open end;
a plurality of second communication port rows arranged in the first direction so as to correspond to the plurality of second layered header passages, respectively, wherein each second communication port row is formed by a plurality of second communication ports arranged along the reference plane; and
a plurality of second passages communicating with any of the second layered header passages through the plurality of second communication ports,
wherein the first passage has a first transition section configured to be displaced from the first communication port to one side along the first direction as the first passage extends in a second direction perpendicular to the first direction, wherein the second passage has a second transition section configured to be displaced from the second communication port to one side along the first direction as the second passage extends in the second direction, wherein the first passage has an offset first passage that is displaced from the first communication port to one side of the first direction and a non-offset first passage that is not displaced from the first communication port, wherein the second passage has an offset second passage that is displaced from the second communication port to one side of the first direction and a non-offset second passage that is not displaced from the second communication port, wherein the first passage that is composed of only the non-offset first passage and the second passage that is composed of only the non-offset second passage are stacked alternately in the first direction at the same position in a third direction perpendicular to the first and second directions, and wherein the first passage that has the offset first passage and the second passage that has the offset second passage are stacked alternately in the first direction at the same position in the third direction.

2. The heat exchanger core according to claim 1,
wherein the plurality of first layered header passages and the plurality of second layered header passages are alternately stacked in the perpendicular direction, and
wherein the plurality of first communication port rows and the plurality of second communication port rows are alternately arranged in the perpendicular direction.

3. The heat exchanger core according to claim 2,
wherein the plurality of first layered header passages and the plurality of second layered header passages are disposed so as to overlap each other in plan view as viewed from the perpendicular direction, and
wherein the first header space is disposed outside an arrangement region of the second header space in the plan view.

4. The heat exchanger core according to claim 1,
wherein the first header space has a polyhedral shape including the first edge as one face, and
wherein the second header space has a polyhedral shape including the second edge as one face.

5. The heat exchanger core according to claim 1,
wherein the plurality of first layered header passages is disposed in an arrangement area of the plurality of first passages when viewed along an extension direction of the plurality of first passages, and
wherein the plurality of second layered header passages is disposed in an arrangement area of the plurality of second passages when viewed along an extension direction of the plurality of second passages.

6. The heat exchanger core according to claim 1,
wherein the first header space overlaps at least a portion of an arrangement area of the plurality of first passages when viewed along an extension direction of the plurality of first passages, and
wherein the second header space overlaps at least a portion of an arrangement area of the plurality of second passages when viewed along an extension direction of the plurality of second passages.

7. The heat exchanger core according to claim 1,
wherein the first header space overlaps at least a portion of a range occupied by the plurality of first layered header passages when viewed along an extension direction of the plurality of first passages, and
wherein the second header space overlaps at least a portion of a range occupied by the plurality of second layered header passages when viewed along an extension direction of the plurality of second passages.

8. The heat exchanger core according to claim 1,
wherein at least part of the plurality of first passages overlaps along the perpendicular direction the second passage that is disposed on at least one of one side or another side along an arrangement direction of the plurality of first communication ports in each first communication port row.

9. The heat exchanger core according to claim 8,
wherein at least part of the plurality of first passages is substantially in the same arrangement position along the perpendicular direction as the second passage that is disposed on at least one of the one side or the another side.

10. The heat exchanger core according to claim 9,
wherein at least part of the plurality of first passages is sandwiched between two second passages disposed on the one side and the another side and is sandwiched between two second passages disposed on one side and another side of the first passage in the perpendicular direction.

11. The heat exchanger core according to claim 8,
wherein, in each first communication port row, the first passage that is disposed at substantially the same position as the first communication port and the first passage that is disposed at a position displaced in the perpendicular direction from the first communication port are alternately arranged one after another when viewed along an extension direction of the first passages, and
wherein, in each second communication port row, the second passage that is disposed at substantially the same position as the second communication port and the second passage that is disposed at a position displaced in the perpendicular direction from the second communication port are alternately arranged one after another when viewed along an extension direction of the second passages.

12. The heat exchanger core according to claim 11,
wherein, among the plurality of first passages, the first passage that is connected to the first communication port and disposed at a position displaced in the perpendicular direction from the first communication port has a first transition section formed such that a position with respect to the first communication port is gradually displaced in the perpendicular direction from the first communication port toward the first passage, and
wherein, among the plurality of second passages, the second passage that is connected to the second communication port and disposed at a position displaced in the perpendicular direction from the second communication port has a second transition section formed such that a position with respect to the second communication port is gradually displaced in the perpendicular direction from the second communication port toward the second passage.

13. A heat exchanger, comprising the heat exchanger core according to claim 1.

* * * * *